(12) United States Patent
Radunovic et al.

(10) Patent No.: US 11,394,581 B2
(45) Date of Patent: Jul. 19, 2022

(54) TELECOMMUNICATIONS NETWORK WITH DATA CENTRE DEPLOYMENT

(71) Applicant: Microsoft Technology Licensing, LLC, Redmond, WA (US)

(72) Inventors: Bozidar Radunovic, Cambridge (GB); Christos Gkantsidis, Ely (GB); Thomas Karagiannis, Cambridge (GB); Parisa Jalili Marandi, Cambridge (GB); Binh Quang Nguyen, Salt Lake City, UT (US); Matthew John Balkwill, Trowbridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 16/460,430

(22) Filed: Jul. 2, 2019

(65) Prior Publication Data
US 2020/0028712 A1    Jan. 23, 2020

Related U.S. Application Data

(63) Continuation of application No. 15/406,348, filed on Jan. 13, 2017, now Pat. No. 10,374,829.

(51) Int. Cl.
*H04L 12/46* (2006.01)
*H04L 67/1034* (2022.01)
(Continued)

(52) U.S. Cl.
CPC ............ *H04L 12/4633* (2013.01); *H04L 1/18* (2013.01); *H04L 41/0659* (2013.01);
(Continued)

(58) Field of Classification Search
CPC ... H04L 12/4633; H04L 1/18; H04L 41/0659; H04L 41/0668; H04L 67/1034; H04L 67/2852
See application file for complete search history.

(56) References Cited

U.S. PATENT DOCUMENTS 8,977,766 B2 * 3/2015 Peters ................. H04L 67/1008
709/231
2012/0072608 A1  3/2012 Peters et al.
(Continued)

FOREIGN PATENT DOCUMENTS

CN    103067428 A    4/2013
CN    104521196 A    4/2015
(Continued)

OTHER PUBLICATIONS

"Transmission Control Protocol", Retrieved From: https://en.wikipedia.org/w/index.php?title=Transmission_Control_Protocol&oidid=759623021, Retrieved Date: Feb. 19, 2021, pp. 1-12.
(Continued)

*Primary Examiner* — Rhonda L Murphy
(74) *Attorney, Agent, or Firm* — Schwegman Lundberg & Woessner, P.A.

(57) ABSTRACT

In various examples there is a telecommunications network access point of a telecommunications network in which the control plane is implemented using a data center comprising a plurality of interconnected computation nodes. The access point comprises a memory holding a log of encapsulated control messages the control messages being messages of a control protocol of the telecommunications network. The access point has a processor configured, for a control message to be sent by the access point to a node in the data center, to: generate a message identifier; encapsulate the control message in a packet of a communications protocol of the data center, add the message identifier to a header of the encapsulated control message; send the encapsulated control message to the node of the data center; and store a record of the encapsulated control message and node of the control plane in the log.

20 Claims, 13 Drawing Sheets

(51) Int. Cl.
  *H04L 1/18* (2006.01)
  *H04L 67/5682* (2022.01)
  *H04L 41/0668* (2022.01)
  *H04L 41/0659* (2022.01)
  *H04W 24/04* (2009.01)

(52) U.S. Cl.
  CPC ...... *H04L 41/0668* (2013.01); *H04L 67/1034* (2013.01); *H04L 67/2852* (2013.01); *H04W 24/04* (2013.01)

(56) References Cited

U.S. PATENT DOCUMENTS

| | | | |
|---|---|---|---|
| 2012/0303835 A1 | 11/2012 | Kempf et al. | |
| 2015/0103835 A1 | 6/2015 | Tsyganok | |
| 2015/0244761 A1* | 8/2015 | Tsyganok | G06F 11/08 709/219 |
| 2016/0080505 A1* | 3/2016 | Sahin | H04L 67/1027 709/229 |
| 2018/0188985 A1* | 7/2018 | Wysocki | G06F 12/0866 |

FOREIGN PATENT DOCUMENTS

| | | |
|---|---|---|
| CN | 105164975 A | 12/2015 |
| CN | 105469581 A | 4/2016 |
| CN | 105704755 A | 6/2016 |
| WO | 2016082328 A1 | 6/2016 |

OTHER PUBLICATIONS

"Office Action Issued in European Patent Application No. 17832426.5", dated Feb. 25, 2021, 6 Pages.
"Office Action issued in European Patent Application No. 17832426.5", dated Oct. 27, 2020, 6 Pages.
"5G Network Architecture A High-Level Perspective", In White Paper of Huawei Technologies Co., Ltd., Retrieved on Nov. 12, 2021, 21 Pages.
"5G PPP Architecture Working Group", In Proceedings of the 25th edition of the European Conference on Networks and Communications, Jun. 27, 2016, 60 Pages.
"E-UTRAN Control Plane Protocol", Retrieved from: https://wenku.baidu.com/view/e085ea53647d27284b73518c.html, Mar. 31, 2015, 16 Pages.
"Notice of Allowance Issued in Chinese Patent Application No. 201780083415.1", dated Sep. 14, 2021, 8 Pages.
Meng, Fanyu, "Research and Implementation of NFV Control Plane Data Plane Separation and State Migration", In a Thesis Submitted to Department of Computer Science and Technology, Nanjing University, May 2016, 27 Pages.
Zheng, Fubao, "LTE Protocol—User Plane and Control Plane UE Side Protocol Structure", Retrieved from: https://blog.csdn.net/fb2058/article/details/43524991, Feb. 5, 2015, 6 Pages.

* cited by examiner

TELECOMMUNICATIONS NETWORK WITH DATA CENTRE DEPLOYMENT

CROSS-REFERENCE TO RELATED APPLICATION

This application is a continuation application of U.S. patent application Ser. No. 15/406,348, filed on Jan. 13, 2017, which application is hereby incorporated by reference in its entirety.

BACKGROUND

Cellular networks today, such as fourth generation, long term evolution (4G/LTE) cellular networks and others rely on a complex and expensive infrastructure. This infrastructure comprises dedicated hardware which is configured to give high reliability and which is provided by a telecommunications network provider. As the cellular network grows the telecommunications network provider has to add to the infrastructure and if errors occur, due to equipment failure, the network provider is responsible for replacing network nodes and other equipment.

The embodiments described below are not limited to implementations which solve any or all of the disadvantages of known telecommunications networks.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a telecommunications network access point of a telecommunications network in which the control plane is implemented using a data center comprising a plurality of interconnected computation nodes. The access point comprises a memory holding a log of encapsulated control messages the control messages being messages of a control protocol of the telecommunications network. The access point has a processor configured, for a control message to be sent by the access point to a node in the data center, to:
  generate a message identifier;
  encapsulate the control message in a packet of a communications protocol of the data center, add the message identifier to a header of the encapsulated control message;
  send the encapsulated control message to the node of the data center; and
  store a record of the encapsulated control message and node of the control plane in the log.

In some examples there is a data center computation node comprising a processor executing a control plane node of a cellular telecommunications network. The node has a memory storing an identifier of a last encapsulated control message received from an access point. The node has an agent configured, for an encapsulated control message received from a access point, to check an identifier of the encapsulated control message and to ignore the encapsulated control message if the identifier is lower than the identifier of the last encapsulated control message received from the access point; and otherwise to process the control message using the control plane node executing at the processor.

In some examples there is a data center computation node comprising a processor executing a routing node of a cellular telecommunications network. The computation node has a cache storing a local version of a routing table, where the routing table is held in a persistent store accessible to the routing node via a control plane node of the cellular telecommunications network. The computation node has an agent configured to route a data packet received at the computation node according to the local version of the routing table where the destination of the data packet is available in the local version of the routing table; and to request routing data from a control node having access to the persistent store if the destination of the data packet is not available in the local version of the routing table.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
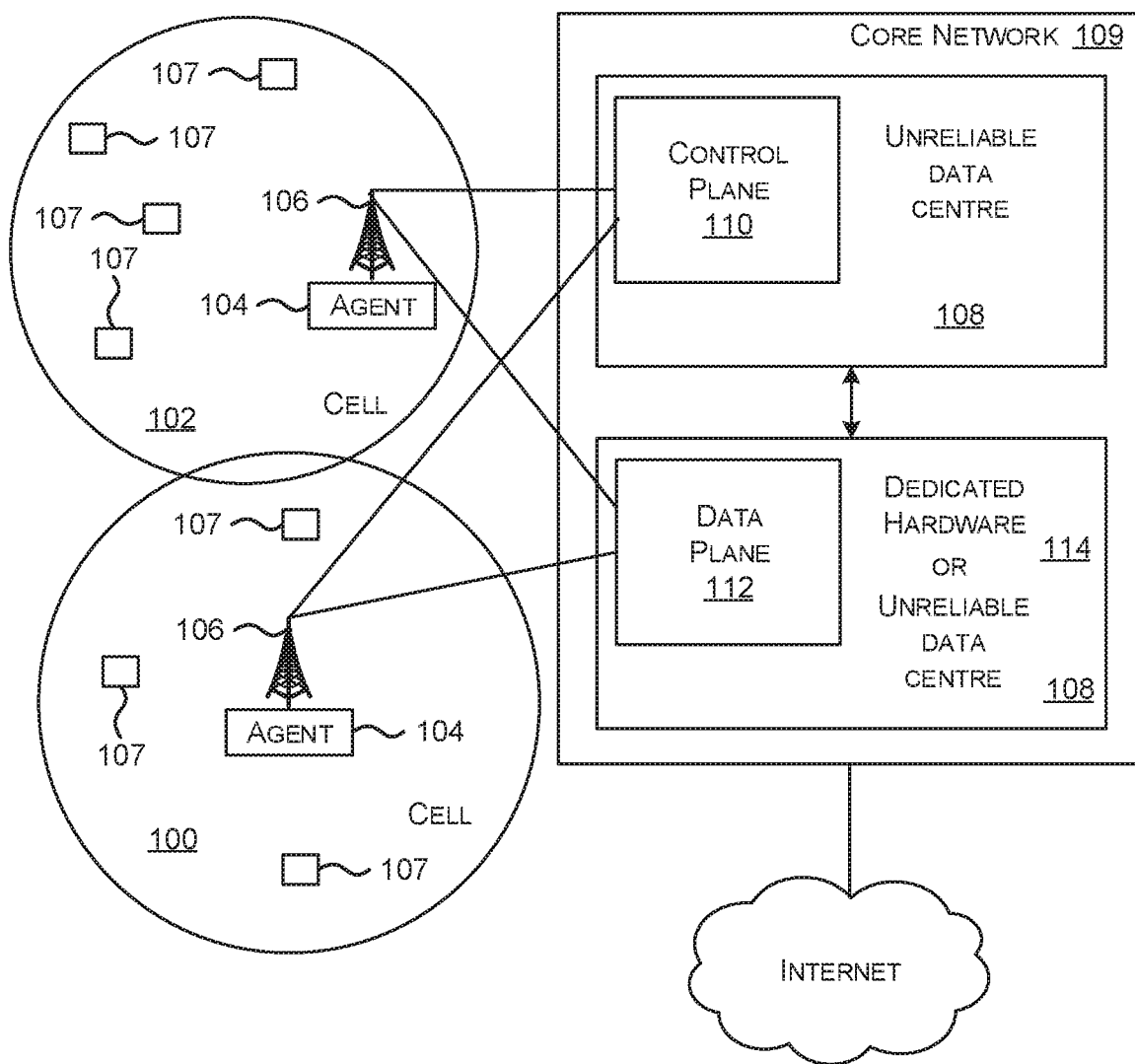
FIG. 1 is a schematic diagram of a cellular telecommunications network having a core network at least partially deployed using a data center.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, cellular telecommunications networks are typically deployed using dedicated infrastructure in order to achieve high reliability and/or high quality of service. The cellular telecommunications network comprises complex and expensive infrastructure which is dedicated to the cellular telecommunications network and which is typically owned, maintained and managed by network providers. This puts a high burden on the network providers. Also, the centralized network architecture used by existing telecommunications infrastructure providers leads to high bandwidth requirements on core network equipment and long communication paths between users and servers, which wastes network resources and increases delay. With the advent of fourth generation long term evolution (4G LTE) technologies demand for high-volume data applications by end users is increasing. However, existing core telecommunications infrastructure is not ideal for meeting this demand because of its centralized nature.

The technology described herein seeks to reduce the burden on network providers by deploying the telecommunications network, at least in part, using cloud infrastructure. The cloud infrastructure offers decentralized computing, smart storage, and on-demand elastic services. The cloud infrastructure is not necessarily dedicated to the telecommunications network; that is the cloud infrastructure may be used for other tasks at the same time as providing the telecommunications network functionality. This improves efficient use of resources since the cloud infrastructure is used for many tasks rather than a single dedicated task. The network provider is able to transfer the burden of maintenance, management, upgrade and provisioning of the complex infrastructure to the cloud provider. The complexity of the telecommunications network infrastructure is reduced by deploying this functionality using cloud infrastructure, since the cloud infrastructure is more flexible (as it can be used for many tasks), and can be scaled up, maintained and managed in an efficient manner.

It is not straightforward to deploy all or part of a core cellular telecommunications network using cloud infrastructure. A cellular telecommunications network uses communications protocols which are designed assuming that the infrastructure being used is highly reliable and robust to failure. However, this is not the case for cloud infrastructure which is inherently unreliable. Also, the communications protocols used by cellular telecommunications networks are incompatible with those used by typical cloud infrastructure. The communications protocols used by cellular telecommunications networks are well defined by standards organizations in order to enable interoperability of equipment provided by different manufacturers. However, it is difficult to achieve a deployment of telecommunications infrastructure in a cloud data center, where that cloud data center by its very nature does not rely on design principles assumed by telecommunications network standards organizations. Architectures and protocols used by cloud data centers are typically designed assuming unreliable hardware, loss of connections between nodes, dropping of packets and fluctuations in quality of service according to changes in demand over time.

The present technology deploys all or part of a core cellular telecommunications network using cloud infrastructure. This is achieved through careful design of a new communications protocol used in the control plane which encapsulates control messages of a standard telecommunications network and adds features which enable recovery in the case of failure. In some examples, a new communications protocol is used in the data plane, where the data plane is deployed in the cloud, with facility to recover routing tables in the event of a failure in the cloud infrastructure. A control plane of a cellular telecommunications network comprises functionality at nodes of the core telecommunications network which carry out management of behavior of nodes in the telecommunications network, such as to control how packets are routed in various parts of the network. A data plane of a cellular telecommunications network comprises functionality of nodes of the core telecommunications network which carry out routing of packets.

FIG. 1 is a schematic diagram of a cellular telecommunications network showing two cells 100, 102 although in practice many more cells are present. Each cell is a geographical region around a access point 106 within which mobile telephones or other communications devices (referred to as user equipment (UEs)) are able to communicate with the access point. Each access point is able to communicate with a core network 109 which routes messages and which provides control functionality such as allowing handover of mobile telephones between cells of the cellular network, quality of service management, coordination between multiple generations of radio access technologies, security and authentication, and others.

The core network 109 may be thought of as comprising a control plane 110 and a data plane 112. The data plane 112 handles routing of data (comprising message content) between nodes of the core network 109 in order that data is communicated between parties, such as sending and receiving user equipment 107 or between user equipment and communications network nodes. The control plane 110 handles communication of control messages which are used to control the nodes of the core network 109 and/or the access points 106 to enable control functionality as mentioned above.

In various examples described herein the control plane 110 is deployed using cloud infrastructure comprising a data center 108. A data center comprises a plurality of computation nodes interconnected using a network. The data center comprises one or more load balancers which distribute computational work between the computation nodes. The data center is inherently unreliable in that one or more of the computation nodes and/or parts of the core network or the access network are expected to fail or be replaced at any time. The data center executes more than one type of service in some examples, such as acting as a telecommunications network data plane and providing a cloud computation service for a non-telecommunications related task.

In various examples described herein the data plane 112 is deployed using dedicated hardware 114 as in a traditional telecommunications core network. That is, the control plane 110 is deployed using a data center whilst the data plane 112 is deployed using dedicated, complex telecommunications infrastructure 114.

In other examples described herein the data plane 112 is deployed at the agents 104 of the access points.

In other examples described herein both the control plane 110 and the data plane 112 are deployed using a data center 108.

Various hybrid deployments are possible. For example, where the data plane 112 is deployed using a combination of one or more of: dedicated hardware 114, functionality at the access points 104, and data center 108 computation nodes.

Figure 1A:
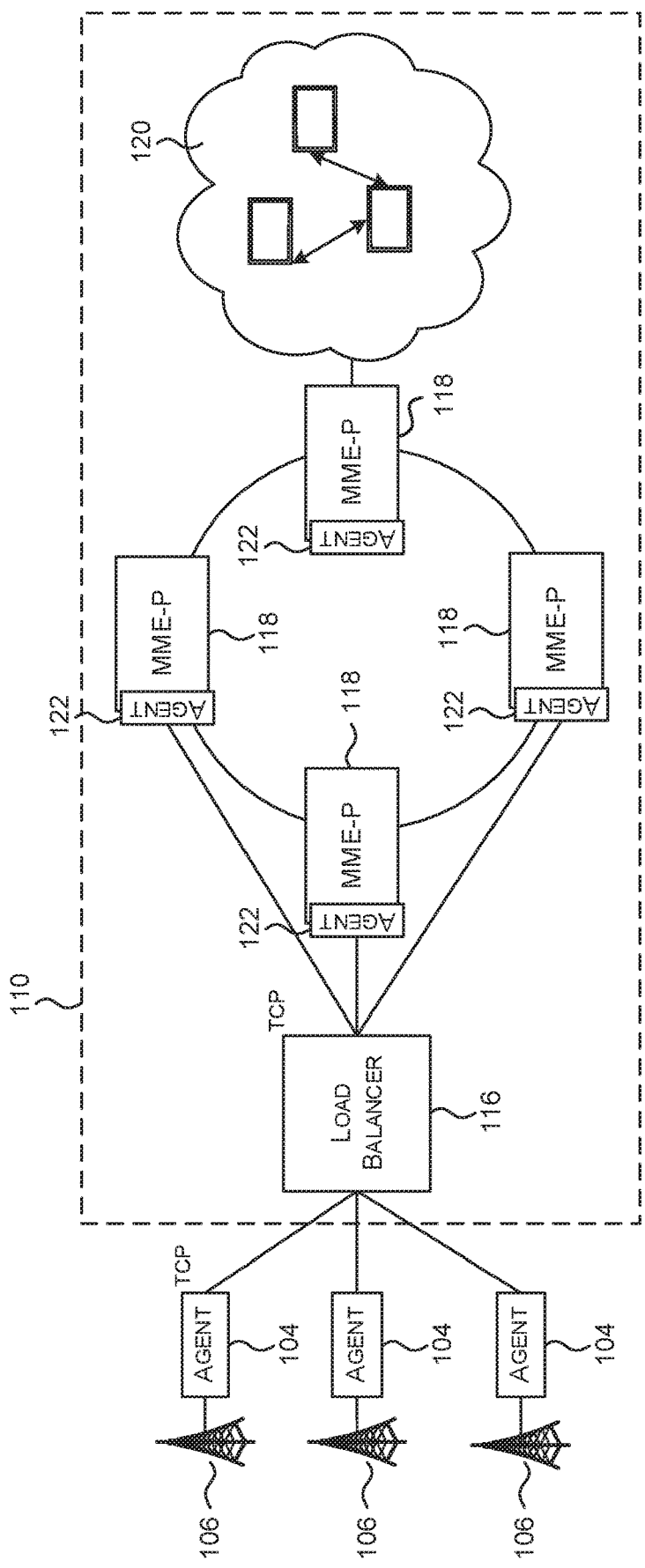
FIG. 1A is a schematic diagram of a control plane of the core network of FIG. 1 in more detail.

FIG. 1A is a schematic diagram of a control plane 110 of the core network 109 of FIG. 1 in more detail. The control plane 110 comprises a load balancer 116 and a plurality of interconnected control nodes, such as mobility management entities (MMEs) 118 or other control nodes. The load balancer 116 is connected to the control nodes 118. The control plane 110 also comprises a plurality of replication nodes 120 which are connected to one another and to the network of control nodes. The replication nodes are used to create a persistent store of information which is used to recover from a failure at the data center 108 in some cases.

One or more access points 106 are able to communicate with the load balancer 116 so that the access points 106 form a radio access network for accessing the control plane 110. Each access point 106 comprises an agent 104 which acts to encapsulate control messages of the telecommunications network, such as S1 messages of a 4G (fourth generation) long term evolution (LTE) cellular network as specified by the Third Generation Partnership Project (3GPP), or other control messages. The encapsulation is done in a manner such that the encapsulated control messages may be sent over a communications link between an agent at an access point 106 and a control plane node of the data center 108 via the load balancer 116. The communications link uses transport control protocol (TCP) or any other communications protocol used by the data center. A communications protocol used by a load balancer of the data center is able to support the communications protocol of the link between the access point and the control plane node.

The control nodes 118 of the control plane are computation nodes of the data center 108 such as virtual machines or other computation nodes and which have functionality of a control node of a cellular telecommunications network, such as a mobility management entity (MME) or other control node. Individual ones of the control nodes 118 have an agent which is able to recognize the encapsulated control messages sent by a access point and respond in a manner that facilitates recovery or graceful failure in the case of a failure at the data center 108.

The replication nodes 120 are also computation nodes of the data center 108. Although the replication nodes 120 are shown as being separate entities in FIG. 1A it is also possible for these nodes to be distributed over the control nodes. That is, a single virtual machine of the data center 108 may implement both a replication node 120 and a control node 118.

In some examples, the load balancer is assumed to consistently direct messages received from a particular access point to the same MME. For example, the load balancer implements a consistent hashing scheme.

Figure 1B:
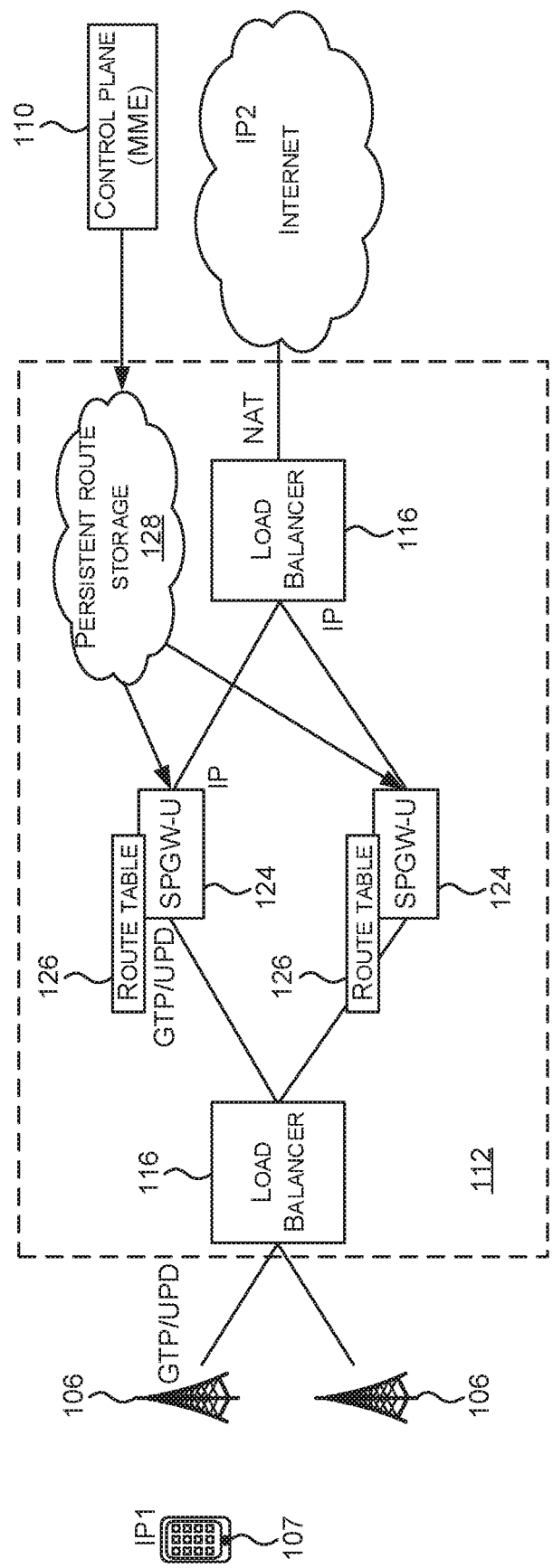
FIG. 1B is a schematic diagram of a data plane of the core network of FIG. 1 in more detail.

FIG. 1B is a schematic diagram of a data plane of the core network of FIG. 1 in more detail. In this case the data plane is deployed using a data center 108 in the cloud. The data plane comprises at least one load balancer 116. FIG. 1B shows two load balancers 116 but this is not essential as it is possible to use a single load balancer 116. The load balancer is connected to a plurality of routing nodes 124, each deployed on a computation node of the data center 108, such as a virtual machine. In an example, a routing node 124 is an integrated service and packet gateway (SPGW) of a 4G LTE telecommunications network. However, any routing node may be used which is capable of forwarding packets of data content through the data plane 112 to specified destinations, using routing information to select an appropriate route. Each routing node has a local store of a route table 126 and ability to access a persistent route storage 128 in the data plane and/or control plane. The persistent route storage 128 comprises a plurality of replication nodes in some examples. Note that although FIG. 1B shows the persistent route storage 128 as being in the data plane this storage may be in the control plane and/or data plane.

The control plane 110 is connected to the data plane 112. For example, one or more of the control nodes of the control plane 110 is able to update the persistent route storage 128 in order to change the paths over which packets are routed in the data plane 112. This is indicated in FIG. 1B by control plane 110 being connected to the persistent route storage 128. The persistent route storage 128 is integral with the distributed storage 120 of FIG. 1A in some cases. In some cases the persistent route storage 128 is implemented using a remote dictionary server persistent key-value store.

The internet is illustrated in FIG. 1B as being connected to the data plane via a load balancer 116. In this way a UE 107 is able to access data from the internet using the telecommunications network deployed in the cloud data center. The example of the internet in FIG. 1B is not intended to limit the technology as an intranet or other type of packet based communications network may also be used.

Figure 2:
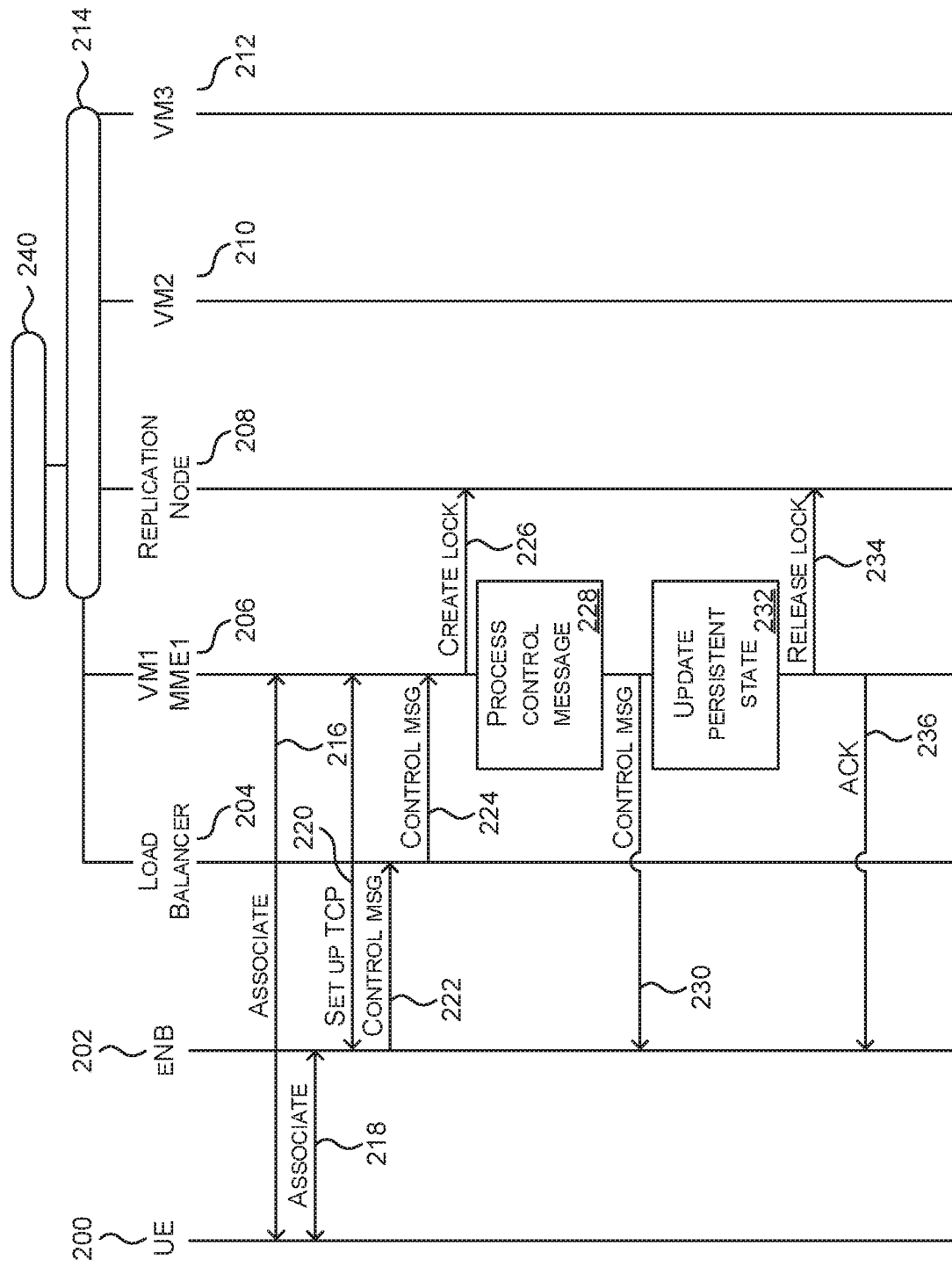
FIG. 2 is a message sequence chart of a control messaging protocol used by a access point of the cellular telecommunications network where the control plane is at least partially implemented using a data center.

FIG. 2 is a is a message sequence chart of a control messaging protocol used by an access point of the cellular telecommunications network where the control plane is at least partially implemented using a data center. Each vertical line in the message sequence chart represents an entity and the arrows between the vertical lines represent messages sent between the entities. The relative vertical position of the arrows represents chronological order of the messages.

FIG. 2 includes the following entities: a user equipment 200 such as a smart phone or other radio communications device, an enodeB 202 or other access point of a cellular telecommunications radio access network, a load balancer 204 of a data center, a virtual machine 206 of the data center (VM1) implementing a control node such as a mobility management entity of a 4G cellular telecommunications network, a replication node 208 implemented at a computation, storage and coordination node of the data center, such as second virtual machine 210 of the data center (VM2), and a third virtual machine (VM3) of the data center. The virtual machines of the data center are interconnected as represented by ring 214 and are connected to load balancer 204. The replication node 208 is one of a plurality of replication nodes at the data center, where these replication nodes are interconnected as represented by ring 240.

In FIGS. 2 and 3 to 8 the agent at the access point 202 and the agent at each MME is not shown for clarity. However, the messaging protocol described is implemented using those agents.

The user equipment (UE) 200 and the MME at VM1 206 are already associated with one another due to a flow of control messages as indicated by double headed arrow 216. This association can be implemented through the load balancer 204 which ensures that messages from one UE 200 arrive to the same MME (until the association changes due to failures or additions of new MMEs). As a result of this association, the UE 200 may know an identifier MME1-ID of MME 1 and the MME1 knows an identifier of the UE, UE-ID. In some cases the UE 200 does not actually know the identity of the MME it works with; the load balancer 204 forwards packets from the UE 200 to the same MME and so the UE 200 is able to operate by knowing the ID of the load balancer. Thus the MME-ID may be used to identify a data center, and within the data center a load balancer allocates packets to individual nodes deploying MMEs. The association is achieved by the UE sending an attach message to an MME that it selects on the basis of a weighting factor provided by the MMEs to the UEs. The attach message comprises the identifier of the UE. As part of the attachment process the MME sends a message to the UE comprising an identifier of the MME. In a similar manner, the UE 200 is already associated with the access point 202 due to a flow of control messages as indicated by double headed arrow 218. Thus the UE 200 knows an identifier of the access point, eNB-ID and the access point knows an identifier of the UE, UE-ID and the MME1-ID.

Suppose the access point has a control message to be sent to MME1. For example, in order to manage mobility of UE 200. In a 4G cellular telecommunications network this is achieved by sending an S1 control message to the MME1 from the access point 202 using 4G telecommunications standards communications protocols. However, MME1 is deployed at VM1 in a data center and the data center is unable to receive S1 control messages. To address this problem, the access point 202 establishes a transport control protocol (TCP) communications channel through the load balancer 204 of the data center to one of the MMEs. A TCP communications channel is one example only and is not intended to limit the technology. The access point 202 is able to establish any bi-directional communications channel with an MME through the load balancer 204 which is able to communicate packet-based communications messages. The access point encapsulates the S1 control message in the payload of a TCP packet and sends the encapsulated control message 222 over the TCP channel to the load balancer. The load balancer forwards the encapsulated control message to MME1 at VM1 of the data center as indicated by arrow 224 over the TCP channel 220 which has already been established.

Because the data center is inherently unreliable it is to be expected that failures in the data center will occur. For example, VM1 may fail. In order to enable the telecommunications network to recover from such failures, or to fail gracefully, the access point 202 creates a log of the encapsulated control messages it sends. This log is used to enable the access point to resend an encapsulated control message in the event a failure at the data center occurs and the encapsulated control message is not acknowledged. The data center has a built in recovery mechanism which, in the event of failure of a VM enables one of the other VMs to take over the role of the failed VM. The load balancer becomes aware of any failed VM, as a result of a polling mechanism or in other ways. The load balancer becomes aware of the identity of the VM which takes over a failed VMs role or it decides on its own which VM to redirect traffic to.

In some examples, the replication nodes 240 of the data center are used to create a persistent store of state of the MMEs such as MME1. This persistent store is used to facilitate recovery from failure at the data center, such as failure of VM1 during operation of VM1 to process the control message using its MME functionality. However, it is not essential to have the replication nodes 240 and creation of the persistent store. In some examples, the log at the access point is used to achieve a coarse grained recovery or graceful failure without the use of the replication nodes 240. When the replication nodes 240 are used to give a persistent store of state of the MME the recovery is more fine grained as described in more detail below.

Where the replication nodes 240 are used, MME1, when it receives the encapsulated control message 224, proceeds to create a lock at one of the replication node 240. This is done by sending a message 226 to one of the replication nodes 240. The lock fixes the memory at the respective replication node so that it stores current state of the MME1 in a manner such that the memory cannot be overwritten or updated by any entities except MME1 until the lock is released. Once the lock is successfully created, the MME1 proceeds to process 228 the control message from the payload of the encapsulated control message. It uses standard 4G MME processing to achieve this by executing that standard 4G MME processing at the VM1. The result of the processing 228 may be to generate and send one or more new S1 control messages. For example, an S1 control message is to be sent to access point 202. To achieve this, the VM1 encapsulates the new S1 control message in the same manner as done by the access point, and sends the encapsulated new S1 control message to the access point 202 as indicated by arrow 230 in FIG. 2.

As a result of the processing 228 the state of the MME1 changes. The state is updated 232 in the persistent store by sending messages to the replication node 208. Once the state is updated the MME1 sends a message 234 to the replication node to release the lock.

The MME1 then sends an acknowledgement message 236 to the access point to acknowledge receipt of the encapsulated control message.

Figure 2A:
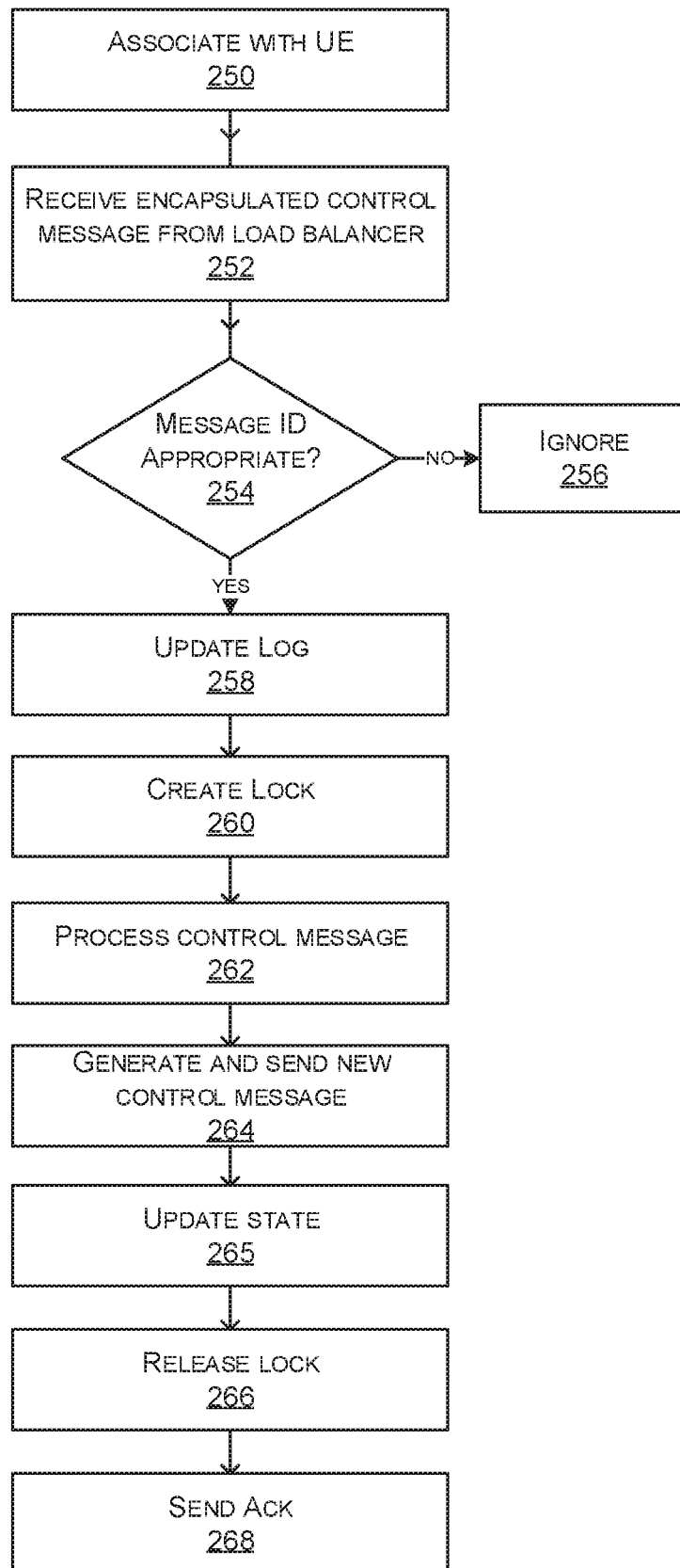
FIG. 2a is a flow diagram of a method of operation at a control node of the core network of FIG. 1.

FIG. 2A is a flow diagram of a method at MME1 206 of FIG. 2. The MME 206 is associated with UE 200 as described above. The MME1 206 receives an encapsulated control message from load balancer 204 of the data center at which the MME 206 is deployed using a virtual machine. MME 1 206 checks a message identifier of the encapsulated control message to see whether the MME 1 206 has already received the encapsulated control message. If the MME has already received the encapsulated control message it ignores 256 the message received at operation 252. If the MME has not already received the encapsulated control message it updates a log 258 of the encapsulated control messages it has received. It creates a lock 260 at a replication node 240 as described with reference to FIG. 2 above where the replication node is one of a plurality of replication nodes which together hold a persistent store of the state of MME1. The MME 1 proceeds to remove the control message from the encapsulation and process 262 the control message using 4G or other functionality suitable for the control message which is executing at VM1 in the data center. As a result, zero, one or more new control messages are generated and sent 264 by MME1 using encapsulation as described above. Any state changes which result at MME1 are stored in the persistent store and then MME1 releases 266 the lock by sending a message to the replication node. MME1 sends 268 an acknowledgment message to the access point to acknowledge receipt of the encapsulated control message received at operation 252.

Figure 2B:
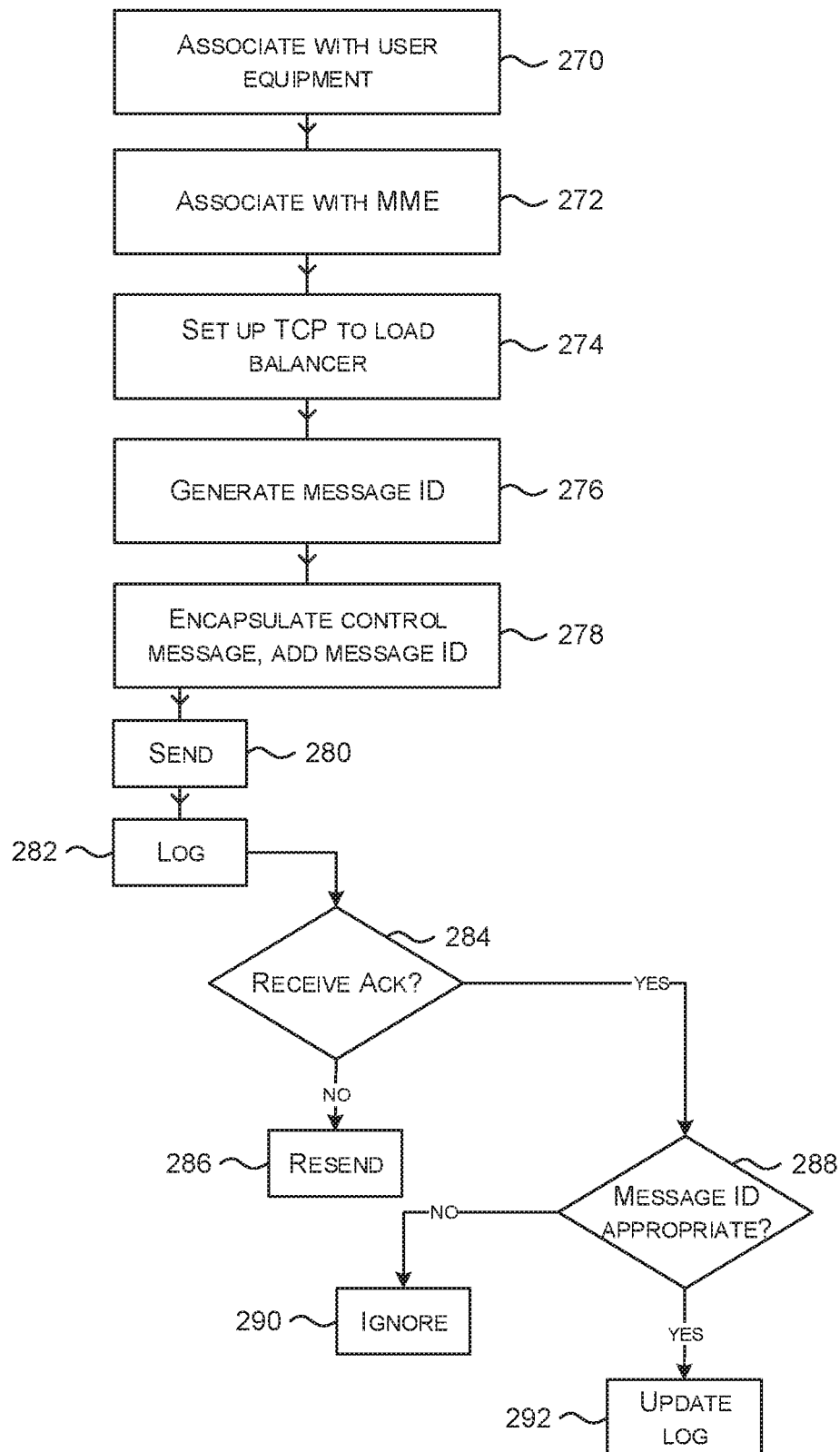
FIG. 2b is a flow diagram of a method of operation at a access point of the cellular telecommunications network of FIG. 1.

FIG. 2B is a flow diagram of a method at an access point such as the access point 202 of FIG. 2. The access point becomes associated 270 with UE 200 as mentioned above and also 272 with MME1 as mentioned above.

The access point sets up 274 a TCP (or other suitable communications link) with MME1 via the load balancer. The access point generates 276 a message identifier for a control message to be sent. It encapsulates 278 the control message in a message suitable for sending over the TCP or other communications link to MME1. This is done by placing the control message in the payload of a new message formed in the messaging protocol of communications link with the load balancer, such as an interne protocol message.

The access point adds information to a header of the encapsulated control message. The added information comprises the identifier of the encapsulated control message, optionally an identifier of the access point, an identifier of the MME the control message is being sent to, and optionally a type of the control message.

The access point sends 280 the encapsulated control message to the data center and it updates 282 a log at the access point. The log stores a copy of the sent message and optionally updates a record of the message ID of the most recently sent control message.

The access point waits and checks 284 whether it receives an acknowledgement from the data center to say that the encapsulated control message was received. If no acknowledgement is received in a specified time, the access point resends 286 the encapsulated control message. If an acknowledgement is received, the access point checks 288 if a message ID of the acknowledgement message is appropriate. For example, it checks if the message ID is lower than a message ID of a most recently received message at the access point. If the message ID is not appropriate the access point ignores 290 the acknowledgement. If the message ID is appropriate the access point updates 292 the log by incrementing the ID of the most recently received message.

Various examples are now described in which there is a failure at the data center and those failures are of different types. In each case it is described how to recover from the failure or to fail gracefully, by using one or more of: the agent at the access point, the agent at the MME, the replication nodes to create a persistent store of MME state.

In FIGS. 2 and 3 to 6 a TCP communications link is set up between the access point and a virtual machine of a data center. In the event that a failure is detected, such as a failure of a VM, dropping of a packet, or other type of failure, the TCP communications link is re-established.

Figure 3:
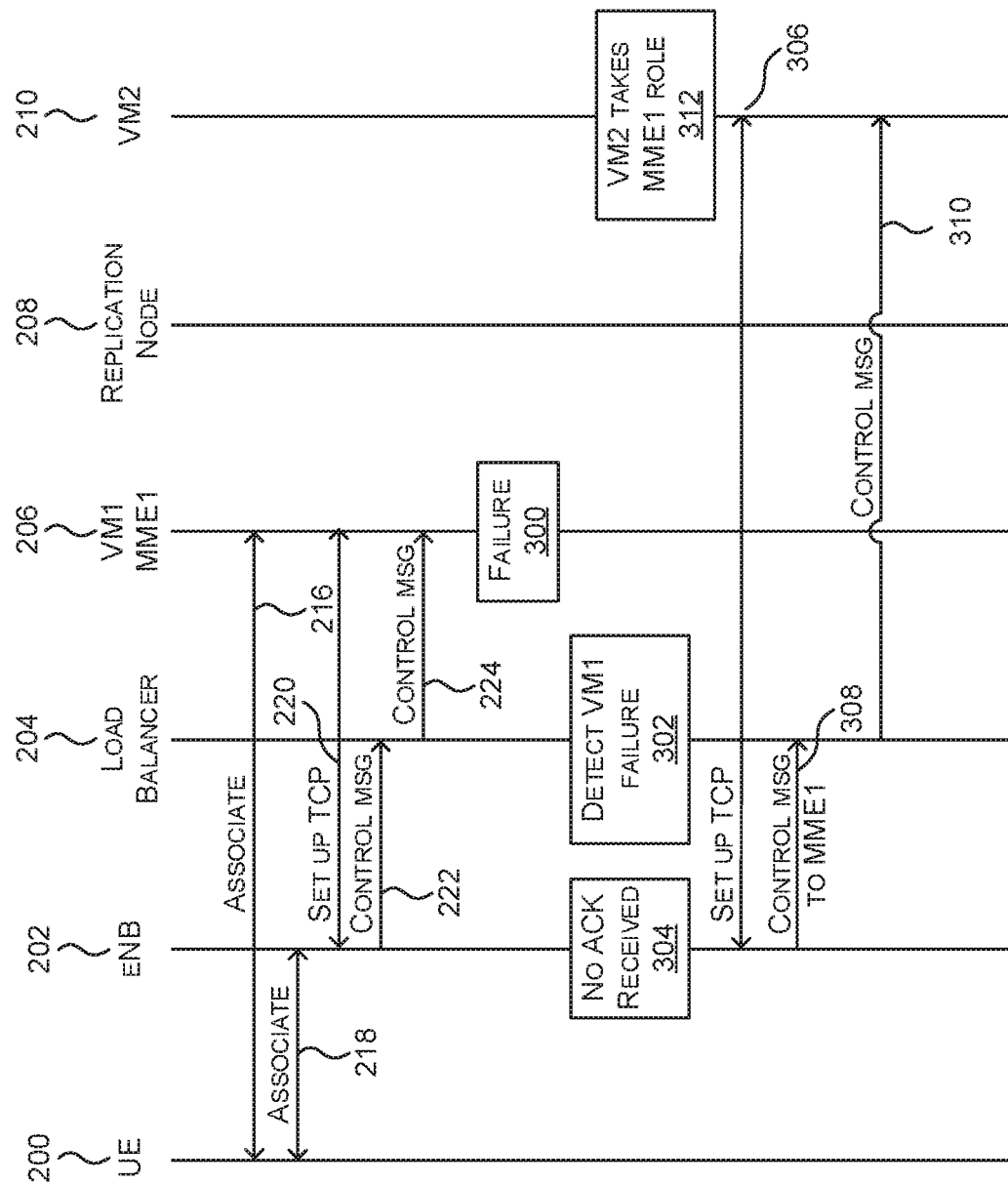
FIG. 3 is a message sequence chart of the messaging protocol used by the access point in the case of a first type of failure at a data center implementing a control node.

FIG. 3 is a message sequence chart which is similar to that of FIG. 2 and illustrating the situation where there is a failure at VM1 after receipt of an encapsulated control message. The arrows 216, 218, 220, 222 and 224 are showing the same message flow as in the corresponding numbered arrows of FIG. 2. The encapsulated control message arrives at VM1 via message 224. VM1 then fails 300 and is unable to proceed with the operations indicated in FIG. 2 such as creating a lock, processing the control message, updating the persistent stored state, releasing the lock and sending an acknowledgement message. The load balancer detects 302 failure of VM1, for example, as a result of a polling mechanism between the load balancer of the data center and the VMs it balanced load between.

The access point 202 does not receive 304 an acknowledgement message within a specified time of sending the control message 222. It therefore sets up 306 a TCP channel with VM210, assuming the TCP channel set up at operation 220 has expired. (Note that other types of communication channel may be used rather than TCP as mentioned above.) The access point 202 resends the encapsulated control message 308 from operation 222. No changes are made to the encapsulated control message 308 from operation 222 and it is simply resent. This is possible since the load balancer knows that VM1 supporting MME1 has failed. The encapsulated control message 308 from operation 222 is addressed to MME1 which has failed and the load balancer recognizes this and forwards the encapsulated control message 310 to VM2. VM2 thus takes the role of MME1.

Figure 4:
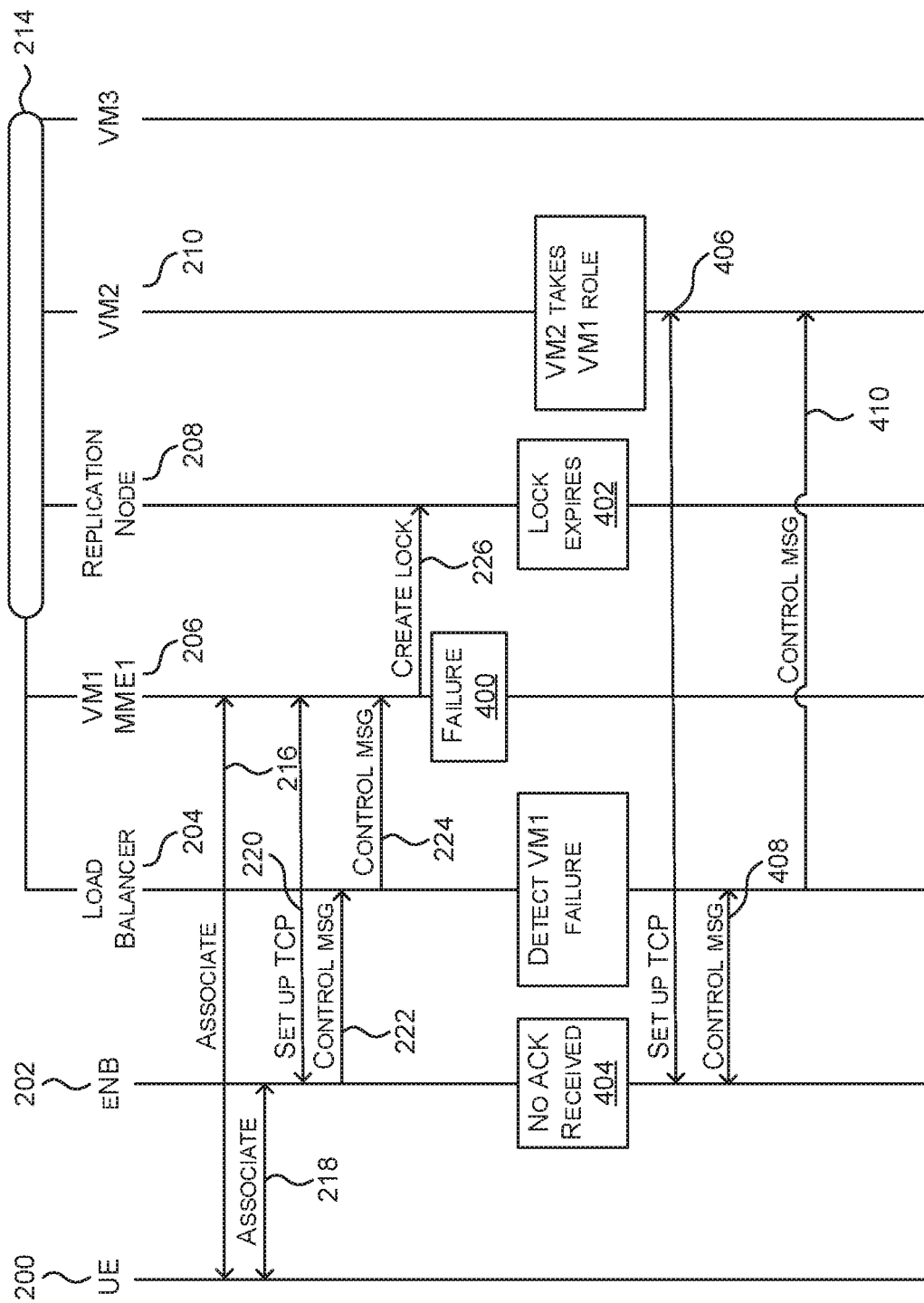
FIG. 4 is a message sequence chart of the messaging protocol used by the access point in the case of a second type of failure at a data center implementing a control node.

FIG. 4 is a message sequence chart similar to FIG. 2 for the situation when there is a failure at VM1 after VM1 has created a lock. Messages 216, 218, 220, 222, 224, 226 are the same as in FIG. 2. After the lock is created at the replication node 208 there is a failure 400 at VM1. The lock at replication node 208 expires 402 after a specified time with no communication with VM1. The load balancer 204 detects failure of VM1 using a polling mechanism or in other ways.

The access point 202 does not receive 404 an acknowledgement message within a specified time of sending the encapsulated control message 222. The access point sets up a TCP or other communications channel 406 with the VM and resends 408 the encapsulated control message 222 in its original form 410. The load balancer 204 knows that VM1 has failed and it forwards the encapsulated control message 410 to VM2 210 which thus takes the former role of VM1. In another example, rather than VM 2 taking the former role of VM1, the former functionality of VM1 is given by one or more of the other VMs of the data center in an informal manner. For example, the load balancer sends the control message 310 to VM2 which processes the control message using relevant state information retrieved from a replication node 208. In order to minimize overheads control messages relating to MME1 are sent to VM2 but this is not essential as any of the other VMs of the data center could also be used.

Figure 5:
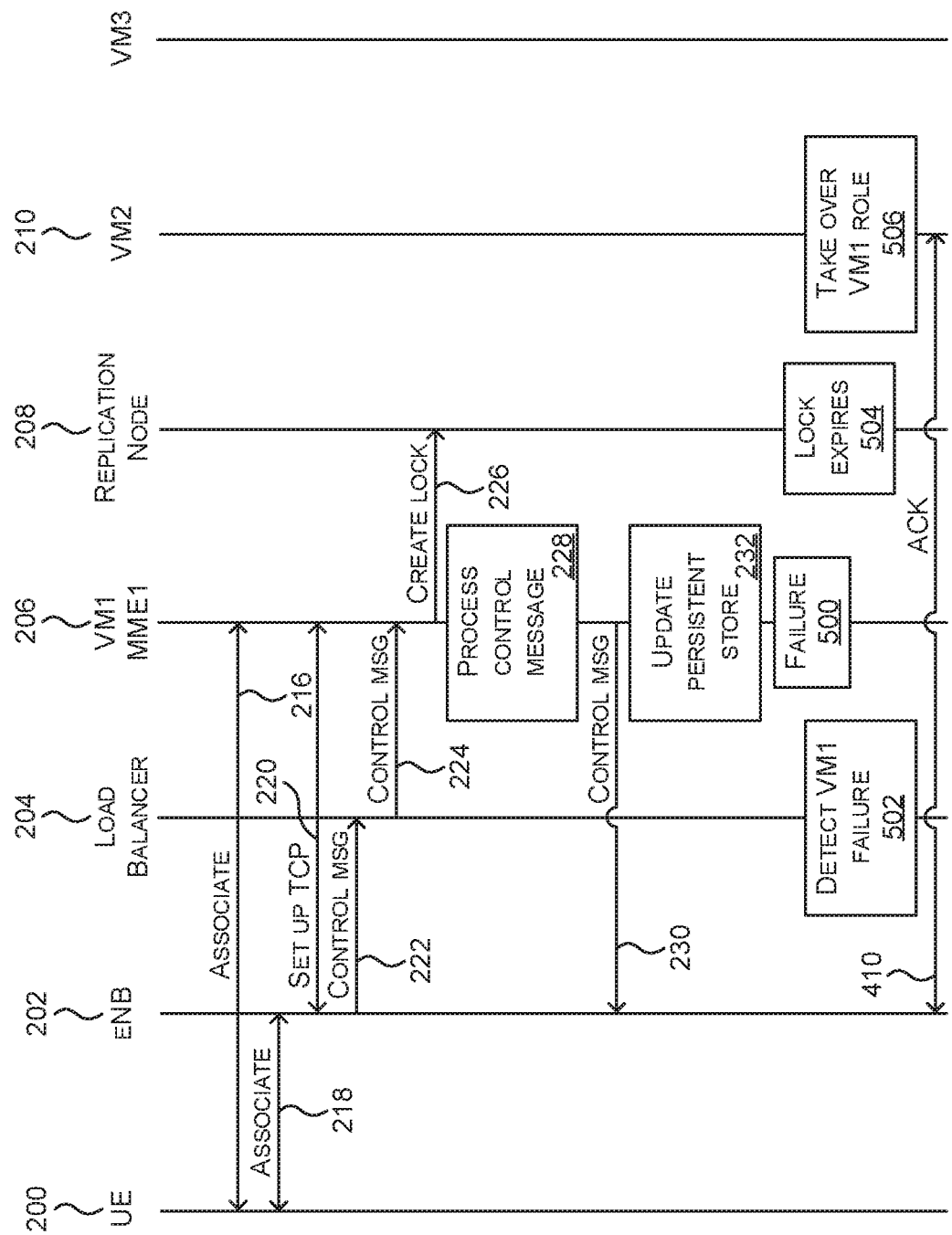
FIG. 5 is a message sequence chart of the messaging protocol used by the access point in the case of a third type of failure at a data center implementing a control node.

FIG. 5 is a message sequence chart similar to FIG. 2 for the situation when there is a failure at VM1 after VM1 has processed the control message. FIG. 5 is similar to FIG. 2 and the message flow and process up to update of the persistent store 232 to reflect the new state of MME1 is the same as for FIG. 2. At this point there is a failure at VM1. The lock at the replication node expires 504 after a specified time with no communication with VM1. The load balancer detects 502 failure of VM1 using a polling mechanism or in other ways. VM2 takes over 506 the role of VM1 as instructed by the load balancer. VM2 is able to retrieve the current state for MME1 from the persistent store created using the replication nodes. VM2 therefore sends an acknowledgement message 508 to the access point.

In various examples the agent at the access point 202 is configured to give timer functionality. A timer is an event to occur after a specified duration and to be triggered by one of the control plane nodes. Since the control plane nodes are deployed in the data center and are expected to fail, the present technology enables timers to be implemented at the access point agent as now explained with reference to FIG. 6.

The agent at VM1 206 sends a timer request message 600 to the access point 202 over a TCP communications channel which has been established already, or any other suitable communications channel. A timer request message 600 comprises, as the payload, a timer identifier and a time out value. The header of the timer request message comprises a message identifier, an identifier of the access point to which the timer request message 600 is to be sent, an identifier of the control node sending the timer request message, and a type value. The type value indicates that the message is a timer request message.

The message identifier is generated by the agent at VM1.

The access point receives the message 600 and recognizes the message 600 as a timer request message from the type value.

The access point adds 602 the timer to a timer list at the access point. The timer list is a list of timers which are currently pending at the access point. For example, each entry in the list comprises: a timer identifier, the access point identifier, the control node identifier (MME1-ID) and a time out value which is a duration for the timer or a time at which the timer expires. The access point 202 sends an acknowledgement message ACK to VM 1 206 to acknowledge receipt of the timer.

Time passes and eventually the timer at the access point expires 604. The access point then sends a timer expiry message 606 to the load balancer which forwards the timer expiry message 608 to MME1 which is at VM1 206. When the agent at VM1 receives the timer expiry message 608 a timed event corresponding to the timer is processed 610.

The MME at VM1 206 then sends a delete message 612 to the access point to delete the timer. The delete message comprises the timer identifier. When the access point receives the delete message 612 it deletes the timer with the appropriate timer identifier 614.

After the MME at VM1 has sent the timer delete message 612 the MME will no longer respond to timer expiry messages 606 for that timer.

The timer request message 600, timer expiry message 606 and timer delete message 612 are used in different combinations in order to achieve different functionality, such as resetting a timer. Resetting a timer is done by first deleting the timer (using a delete timer message 612) and subsequently setting up a new timer using a timer request message 600.

Figure 6:
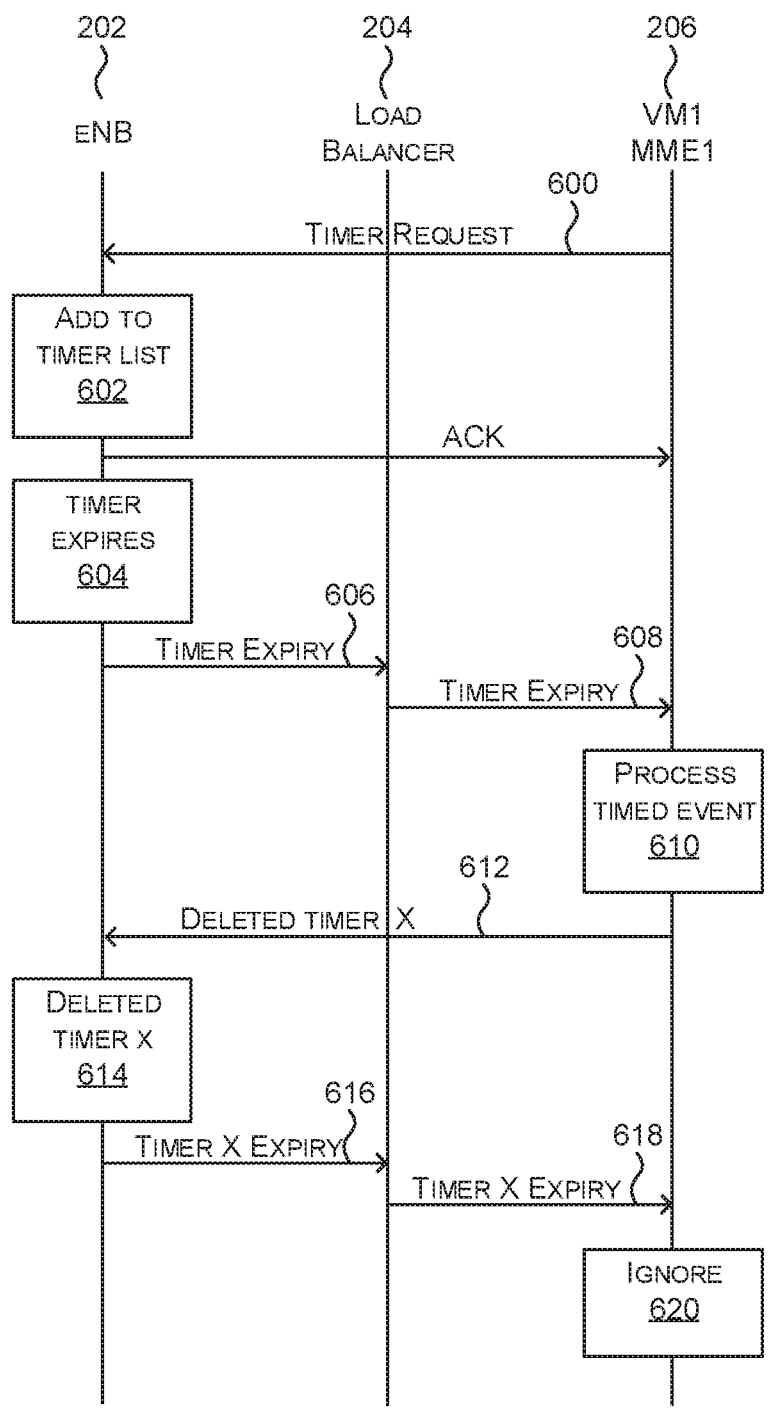
FIG. 6 is a message sequence chart of part of the control messaging protocol used to give timer functionality.

In the example of FIG. 6, the eNB 202 may fail in rare situations. In that case part of the access network has failed. This type of failure means that a UE of the eNB 202 is unable to send and receive communications and the provider of the access network is then tasked with repairs to the access network.

Therefore in the protocol of FIG. 6, when an MME sends a TCP message to eNodeB and receives an ACK in response, it means that the timer is stored safely at eNodeB. The same doesn't hold the other way around as a VM can fail after sending a TCP ACK but before committing and this is addressed as already explained earlier in this document.

In some examples, the process of FIG. 6 is extended so that the timer request message 600 has a message identifier generated by the VM1. The eNB 202 checks the message identifiers and rejects duplicates. This makes sure that the same timer hasn't been generated twice by two VMs doing the same job (because the data center assumed one failed but it didn't).

In some examples the data center is used to deploy at least part of the control plane and at least part of the data plane of the cellular telecommunications network core. The data plane comprises routing nodes 124 which route packets through the core network towards their destination. In an example, each routing node 124 is deployed at a data center node, such as a virtual machine (VM). This enables cellular telecommunications network providers to better manage infrastructure and to more efficiently use that infrastructure. However, there is a need to plan for failure of data center nodes since these are inherently unreliable.

Management of how packets are routed through the core network affects load balancing and bandwidth capacity of communications links between the data plane nodes, thus affecting quality of service experienced at UEs. Packets received at a routing node 124 are routed according to destination address information in headers of the packets and information in a routing table. The routing table may be held in a distributed persistent store (see 128 of FIG. 1B) or other persistent store and updated by the control plane (as indicated by the arrow from control plane 110 to the persistent route storage 128 of FIG. 1B). In this way the control plane is able to control load balancing and quality of service.

In various examples described herein, individual routing nodes 124 hold a local cache 126 of a routing table held in a distributed persistent store 128 where the distributed persistent store comprises a plurality of interconnected nodes such as virtual machines or other computing entities. The local cache 126 is updated at intervals by communication between routing nodes 124 and the persistent route storage 128 and so is a good working version of the routing table in the persistent store but is not guaranteed to be an up to date copy at all times. In some examples, the persistent route storage 128 is held at the replication nodes 208 which hold the persistent state of the MMEs. In this case the VMs which implement the MMEs also implement control connections between the control plane and the data plane of the core telecommunications network. In this way the routing nodes of the data plane do not need to carry out any updates of the data held in the distributed persistent store. This configuration is beneficial as it removes the need to allow for recovery of state as a result of failure of a routing node deployed in the data center. Because the control plane is responsible for updating the state, including the routing table state, the data center deployment is able to work well despite inherently reliability. This is because methods such as those described with reference to FIGS. 2 to 6 are used to allow for the inherent unreliability.

Figure 7:
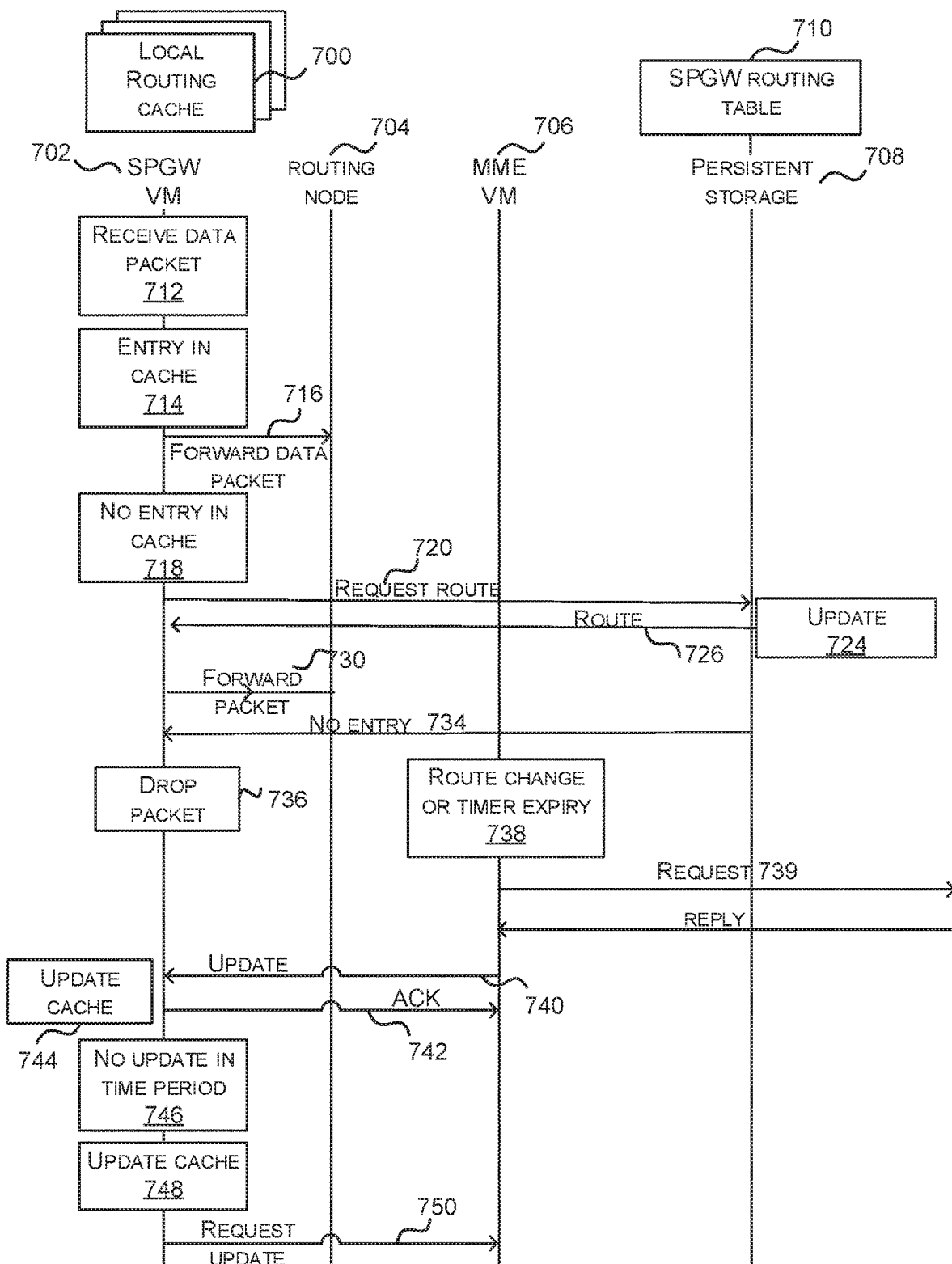
FIG. 7 is a message sequence chart of a messaging protocol used at a data plane of the core network where at least part of the data plane is implemented at a data center.

In order to allow for the fact that the persistent store of the routing table is updated by the control plane rather than the data plane (as is the case in some traditional cellular telecommunications core networks) a method such as that of FIG. 7 is used. This enables the routing nodes to use local caches of the persistent routing table, even though these local caches are not always up to date.

FIG. 7 is a message sequence chart showing a routing node 702 which in this example is a virtual machine of a data center having functionality of an SPGW (integrated service and packet gateway) of a 4G cellular telecommunications network. The routing node has a plurality of caches 700 of local versions of routing tables for individual UE-MME pairs.

The message sequence chart of FIG. 7 also shows another routing node 704, a control plane node such as a VM deploying a MME 706, and a persistent storage node 708 which is one of a plurality of persistent storage nodes 708 together forming a persistent distributed store of a routing table 710.

When routing node 702 receives a data packet 712, such as from the load balancer or from another routing node, it looks up the source and destination addresses of the data packet in the header of the packet. It finds the appropriate cached routing table from its local store and looks up the destination address. If there is an entry for the destination address, the routing node 702 forwards 716 the data packet to the routing node (or other entity) listed in the routing table. Suppose this is routing node 704 in the example of FIG. 7.

If no entry is found 718 for the destination address in the appropriate cached routing table, the routing node 702 sends a route request message 720 to the persistent storage node 708. The persistent storage node makes a record that route data has been requested by the routing node 702. The persistent storage node 708 sends the requested route data back 726 to the routing node 702. The routing node 702 now has the data it needs to forward the packet 730 and sends the packet to another routing node such as node 704.

If the persistent storage node 708 finds no entry for the requested route available in the persistent store, it sends a no entry message 730 back to the routing node 702. The packet is then dropped 736 since the routing node does not know where to forward the packet to next.

If there is a change to the persistent routing table, or an expiry of a timer 738 at the MME 706 the MME deployed at a VM sends an update message 740 to the routing node 702. The routing node updates its cache of the routing table 744 and sends an acknowledgment message 742 back to the MME 706. The list of SPGW VMs that hold routing tables in cache is stored in the persistent storage. Thus an MME fetches that list using request 739 of FIG. 7 and receives a reply rather than storing the list itself as it is unreliable.

If there has been no update to the local cache of a routing table during a time period 746 the routing node seeks to update its cache 748 and sends a request for an update 750 to the MME 706.

If the management of the routing table state is taken care of in the control plane, the data center deployment still needs to address inherent unreliability of data center nodes acting as data plane routing nodes. This is done achieved through the use of the load balancer which detects if a data center node fails, using a polling mechanism or in other ways. The load balancer assigns another node of the data center to take the former role of the failed node. The load balancer forwards packets addressed to a failed node to the node which has taken over the role of the failed node. For example, the load balancer uses a distribution mode whereby it consistently forwards packets with a given source address and destination address to a particular routing node. In an example, the distribution mode is referred to as source IP (internet protocol) affinity.

Figure 8:
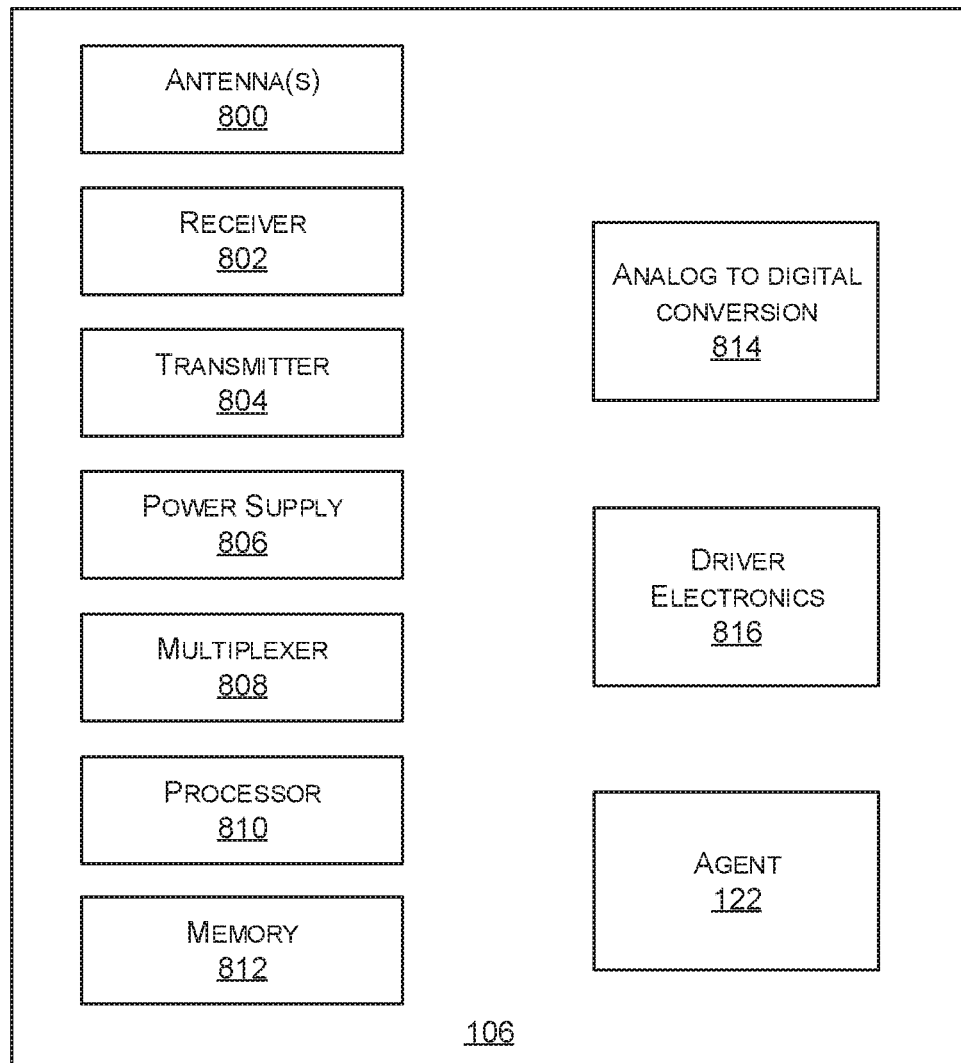
FIG. 8 illustrates an exemplary computing-based device in which embodiments of a cellular network access point are implemented.

FIG. 8 is a schematic diagram of an access point 106 of a cellular telecommunications network used to implement the present technology. It comprises an agent 122 formed from any combination of software, hardware and firmware, which implements the methods of any of FIGS. 2 to 6. The access point has one or more radio frequency antennas 800 and a receiver 802 and a transmitter 805 connected to the antennas 800 for enabling radio frequency signals to be transmitted to and received from UEs, and nodes of a data center. An analog to digital converter 814 transforms radio frequency signals to digital form and vice versa. A multiplexer 808 multiplexes or de-multiplexes packets to accommodate several signals in a single communications channel of the access point. A power supply 806 provides power to the antennas 800 and to the access point electronics. The access point electronics also comprise one or more processors 810 for implementing instructions stored in memory 812 and driver electronics 816 to drive the transmitter 804 and receiver 802.

Figure 9:
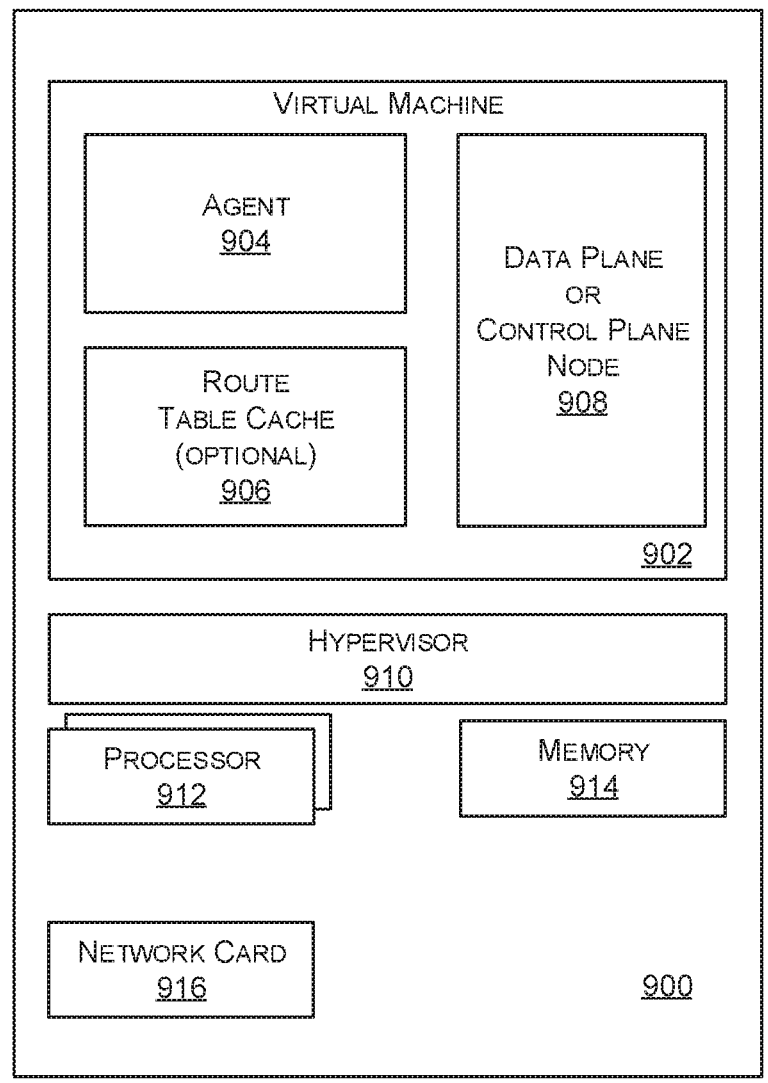
FIG. 9 illustrates an exemplary computing-based device in which embodiments of a data center computation node are implemented.

FIG. 9 illustrates various components of an exemplary computing-based device 900 which are implemented as any form of a computing and/or electronic device, and in which embodiments of a data center node deploying a node of a cellular telecommunications control or data plane are implemented in some examples.

Computing-based device 900 comprises one or more processors 912 which are microprocessors, controllers or any other suitable type of processors for processing computer executable instructions to control the operation of the device in order to implement a node of a core of a cellular telecommunications network. In some examples, for example where a system on a chip architecture is used, the processors 912 include one or more fixed function blocks (also referred to as accelerators) which implement a part of the method of any of FIGS. 2 to 7 in hardware (rather than software or firmware). Platform software comprising a hypervisor 910 is provided at the computing-based device to enable one or more virtual machines 902 to be executed at the computing-based device.

The computer executable instructions are provided using any computer-readable media that is accessible by computing based device 900. Computer-readable media includes, for example, computer storage media such as memory 914 and communications media. Computer storage media, such as memory 914, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 914) is shown within the computing-based device xxx it will be appreciated that the storage is, in some examples, distributed or located remotely and accessed via a network or other communication link (e.g. using network card 916 or any other suitable communications interface). The network card 916 enables the computing-based device to connect to a network of a data center for example.

Alternatively or in addition to the other examples described herein, examples include any combination of the following:

A telecommunications network access point of a telecommunications network in which the control plane is implemented using a data center comprising a plurality of interconnected computation nodes, the access point comprising:
  a memory holding a log of encapsulated control messages the control messages being messages of a control protocol of the telecommunications network;
  a processor configured, for a control message to be sent by the access point to a node in the data center, to:
  generate a message identifier;
  encapsulate the control message in a packet of a communications protocol of the data center, add the message identifier to a header of the encapsulated control message;
  send the encapsulated control message to the node of the data center; and
  store a record of the encapsulated control message and node of the control plane in the log.

The telecommunications network access point described above wherein the processor is configured to establish a communications link with the node of the data center, where the communications link is compatible with the communications protocol of the data center, and to send the encapsulated control message over the communications link.

The telecommunications network access point described above wherein the node of the data center is a load balancer configured to identify a failed node of the data center and to forward messages intended for the failed node to the same alternative node of the data center.

The telecommunications network access point described above wherein the processor is configured to clear the encapsulated control message from the log in response to receiving an acknowledgement from the node, the acknowledgement comprising the message identifier of the encapsulated control message.

The telecommunications network access point described above wherein the processor is configured to, in response to expiry of a time limit before receiving the acknowledgement, resend the encapsulated control message to the node.

The telecommunications network access point described above wherein the processor is configured to resend the encapsulated control message to the node with the same destination details as used in the encapsulated control message when it was first sent.

The telecommunications network access point described above wherein the processor is configured to ignore the acknowledgement if the acknowledgement comprises a message identifier lower or equal to the last message identifier stored in the log for the node.

The telecommunications network access point described above the memory storing a list of one or more timers, each timer comprising a timer identifier and an expiry time; each timer having been received from a computation node of the data center.

The telecommunications network access point described above wherein the processor is configured, in the event of an expiry time of a timer in the list of timers being reached, to send a timer expiry message to the data center.

A data center computation node comprising:
  a processor executing a control plane node of a cellular telecommunications network;
  a memory storing an identifier of a last encapsulated control message received from an access point;
  an agent configured, for an encapsulated control message received from an access point, to check an identifier of the encapsulated control message and to ignore the encapsulated control message if the identifier is lower than the identifier of the last encapsulated control message received from the access point; and otherwise to process the control message using the control plane node executing at the processor.

The data center computation node described above wherein, the agent is configured to, in the case the control message is processed by the control plane node, to establish a lock on a persistent store of state of the control plane node, before the control message is processed by the control plane node.

The data center computation node described above wherein the agent is configured to update the persistent store to reflect current state of the control plane node before releasing the lock The data center computation node described above wherein the agent is configured to send an acknowledgement message comprising the identifier of the encapsulated control message, to the access point, after processing the control message by the control plane node.

The data center computation node described above wherein the agent is configured to implement timer processes at the access point such that the timer processes are independent of the data center computation node in the event of failure of the data center computation node.

The data center computation node described above wherein the agent is configured to implement a timer process at the access point by sending a timer request message to the access point, the timer request message comprising a timer identifier and an expiry time.

The data center computation node described above which is configured to receive requests from a routing node of the telecommunications network, the routing node implemented at the data center, the requests being for route data from a persistent store of a routing table accessible to the data center computation node.

The data center computation node described above which is configured to update the routing table at the persistent store and to send information about the update to the routing table to one or more routing nodes of the telecommunications network which are implemented at the data center.

A data center computation node comprising:
  a processor executing a routing node of a cellular telecommunications network;
  a cache storing a local version of a routing table, where the routing table is held in a persistent store accessible to the routing node via a control plane node of the cellular telecommunications network;
  an agent configured to route a data packet received at the computation node according to the local version of the routing table where the destination of the data packet is available in the local version of the routing table; and to request routing data from a control node having access to the persistent store if the destination of the data packet is not available in the local version of the routing table.

The data center computation node described above wherein the processor is configured to send a request to the control node for an update to the local version of the routing table.

The data center computation node described above wherein the processor is configured to send the request if no update has been received from the control node with a specified time.

A method at a telecommunications network access point of a telecommunications network in which the control plane is implemented using a data center comprising a plurality of interconnected computation nodes, the method comprising:
  storing a log of encapsulated control messages the control messages being messages of a control protocol of the telecommunications network;
  for a control message to be sent by the access point to a node in the data center;
  generating a message identifier;
  encapsulating the control message in a packet of a communications protocol of the data center, add the message identifier to a header of the encapsulated control message;
  sending the encapsulated control message to the node of the data center; and storing a record of the encapsulated control message and node of the control plane in the log.

A method at a data center computation node comprising:
  executing a control plane node of a cellular telecommunications network;
  storing an identifier of a last encapsulated control message received from an access point;
  for an encapsulated control message received from an access point, checking an identifier of the encapsulated control message and ignoring the encapsulated control message if the identifier is lower than the identifier of the last encapsulated control message received from the access point; and otherwise processing the control message using the control plane node being executed.

A method at a data center computation node comprising:
executing a routing node of a cellular telecommunications network;
caching a local version of a routing table, where the routing table is held in a persistent store accessible to the routing node via a control plane node of the cellular telecommunications network;
routing a data packet received at the computation node according to the local version of the routing table where the destination of the data packet is available in the local version of the routing table; and requesting routing data from a control node having access to the persistent store if the destination of the data packet is not available in the local version of the routing table.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

We claim:

1. A data center for providing reliable network functionality for a telecommunications network, the data center comprising:
a load balancer implemented using hardware and configured to receive an encapsulated message from an access point of the telecommunications network, the encapsulated message including a control message of a control protocol of the telecommunications network;
a plurality of virtual machines implemented using hardware and configured to act as control nodes for the telecommunications network, each virtual machine configured to receive and process the encapsulated message from the load balancer to control respective ones of the plurality of virtual machines according to the encapsulated message;
wherein a first one of the plurality of virtual machines is associated to act as a respective control node for an end user device associated with the encapsulated message and receive the encapsulated message from the load balancer, and
wherein a second one of the plurality of virtual machines is associated to act as the respective control node for the end user device upon failure of the first one of the plurality of virtual machines;
a persistent data store configured to store routing table data, wherein a second plurality of virtual machines are configured to access the routing table data from the persistent data store upon determination that any one of a plurality of routing nodes does not have a cached route to route a data packet from the end user device to a destination.

2. The data center of claim 1, further comprising:
a replication node implemented using hardware, wherein the first one of the plurality of virtual machines is configured to transmit a message to the replication node upon receipt of the encapsulated message to store state information of the first one of the plurality of virtual machines.

3. The data center of claim 2, wherein the second one of the plurality of virtual machines is configured to access the state information from the replication node upon receipt of the encapsulated message following the failure of the first one of the plurality of virtual machines.

4. The data center of claim 1, wherein the load balancer is configured to transmit the encapsulated message to the first one of the plurality of virtual machines using a protocol different than the control protocol of the telecommunications network.

5. The data center of claim 4, wherein the telecommunications control protocol is a long term evolution (LTE) control protocol and wherein the data center protocol is a transmission control protocol (TCP).

6. The data center of claim 1, wherein the load balancer is further configured to:
receive a first instance of the encapsulated message from the access point and transmit the first instance to the first one of the plurality of virtual machines;
detect failure of the first one of the plurality of virtual machines; and
receive a second instance of the encapsulated message from the access point and transmit the second instance to the second one of the plurality of virtual machines.

7. The data center of claim 6, wherein the load balancer is configured to detect failure of the first one of the plurality of virtual machines via polling.

8. The data center of claim 1, wherein the plurality of virtual machines is a first plurality of virtual machines, and wherein the data center further comprises:
a second plurality of virtual machines implemented using hardware and configured to act as routing nodes for the telecommunications network;
wherein a first one of the second plurality of virtual machines is associated to act as a respective routing node for the end user device and route a data packet from the end user device to a destination, and
wherein a second one of the second plurality of virtual machines is associated to act as the respective routing node for the end user device upon failure of the first one of the second plurality of virtual machines.

9. The data center of claim 8, wherein:
the persistent data store is implemented in hardware wherein each of the second plurality of virtual machines are configured to access the routing table data from the persistent data store upon determination that a respective one of the second plurality of virtual machines does not have a cached route for the destination of the data packet.

10. A method for providing reliable network functionality for a telecommunications network, the method comprising:
receiving, by a load balancer, an encapsulated message from an access point of the telecommunications network, the encapsulated message including a. control message of a control protocol of the telecommunications network;

receiving, by a first one of a plurality of virtual machines acting as a respective control node for an end user device associated with the encapsulated message, the encapsulated message from the load balancer, wherein the plurality of virtual machines are configured to act as control nodes for the telecommunications network, each virtual machine configured to receive and process the encapsulated message from the load balancer to control respective ones of the plurality of virtual machines according to the encapsulated message;
detecting a failure of the first one of the plurality of virtual machines; and
receiving, by a second one of the plurality of virtual machines associated to act as the respective control node for the end user device upon failure of the first one of the plurality of virtual machines, the encapsulated message from the load balancer;
storing routing table data in a persistent data store, wherein a second plurality of virtual machines are configured to access the routing table data from the persistent data store upon determination that any one of a plurality of routing node does not have a cached route to route a data packet from the end user device to a destination.

11. The method of claim 10, further comprising:
transmitting, by the first one of the plurality of virtual machines, a message to a replication node upon receipt of the encapsulated message to store state information of the first one of the plurality of virtual machines.

12. The method of claim 11, further comprising:
accessing, by the second one of the plurality of virtual machines, the state information from the replication node upon receipt of the encapsulated message following the failure of the first one of the plurality of virtual machines.

13. The method of claim 10, further comprising transmitting, by the load balancer, the encapsulated message to the first one of the plurality of virtual machines using a protocol different than the control protocol of the telecommunications network.

14. The method of claim 13, wherein the telecommunications control protocol is a long term evolution (LTE) control protocol and wherein the data center protocol is a transmission control protocol (TCP).

15. The method of claim 10, wherein detecting the failure of the first one of the plurality of virtual machines comprises detect failure of the first one of the plurality of virtual machines via polling by the load balancer.

16. The method of claim 10, wherein the plurality of virtual machines is a first plurality of virtual machines, and wherein the method further comprises:
acting, by a first one of a second plurality of virtual machines, as a respective routing node for the end user device to route a data packet from the end user device to a destination, and
acting, by a second one of the second plurality of virtual machines, as the respective routing node for the end user device upon detection of a failure of the first one of the second. plurality of virtual machines.

17. The method of claim 16,
wherein each of the second plurality of virtual machines are configured to access the routing table data from the persistent data store upon determination that a respective one of the second plurality of virtual machines does not have a cached route for the destination of the data packet.

18. A system comprising:
load balancing means for receiving an encapsulated message from an access point of a telecommunications network, the encapsulated message including a control message of a control protocol of the telecommunications network;
a plurality of means for acting as control nodes for the telecommunications network, each means for acting as a control node configured to receive and process the encapsulated message from the load balancing means to control respective ones of the plurality of means for acting as control nodes according to the encapsulated message;
wherein a first one of the means for acting as control nodes is associated to act as a respective control node for an end user device associated with the encapsulated message and receive the encapsulated message from the load balancing means, and
wherein a second one of the plurality of means for acting as control nodes is associated to act as the respective control node for the end user device upon failure of the first one of the plurality of means for acting as control nodes;
storage means for storing routing table data;
a second plurality of means for accessing the routing table data from the persistent data store upon determination that any one of a plurality of routing nodes does not have a cached route to route a data packet from the end user device to a destination.

19. The system of claim 18, further comprising:
a plurality of means for acting as routing nodes for the telecommunications network;
wherein a first one of plurality of means for acting as routing nodes is associated to act as a respective routing node for the end user device and route a data packet from the end user device to a destination, and
wherein a second one of the plurality of means for acting as routing nodes is associated to act as the respective routing node for the end user device upon failure of the first one of the plurality of acting as routing nodes.

20. The system of claim 19,
wherein each of the plurality of means for acting as routing nodes are configured to access the routing table data from storage means upon determination that a respective one of the plurality of means for acting as routing nodes does not have a cached route for the destination of the data packet.

* * * * *